(12) United States Patent
Akasu (10) Patent No.: US 6,563,454 B2
(45) Date of Patent: May 13, 2003

(54) FM-CW RADAR APPARATUS (75) Inventor: Masahira Akasu, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/000,300

(22) Filed: Dec. 4, 2001

(65) Prior Publication Data

US 2002/0190893 A1 Dec. 19, 2002

(30) Foreign Application Priority Data

Jun. 13, 2001 (JP) ........................... 2001-178571

(51) Int. Cl.⁷ .................... G01S 13/34; G01S 13/32; G01S 13/38
(52) U.S. Cl. ................... 342/130; 342/109; 342/128
(58) Field of Search ................. 342/128, 109, 342/112, 129, 130

(56) References Cited

U.S. PATENT DOCUMENTS

| 2,695,995 A | * | 11/1954 | Cauchois | ..................... 342/109 |
| 4,388,622 A | * | 6/1983 | Fletcher, Jr. | ................ 342/112 |
| 5,805,104 A | * | 9/1998 | Kunert | ........................ 342/109 |

FOREIGN PATENT DOCUMENTS

| JP | 63-275976 | 11/1988 | ............ G01S/13/34 |
| JP | 2550574 | 8/1996 | ............ G01S/13/34 |

* cited by examiner

*Primary Examiner*—Ian J. Lobo
(74) *Attorney, Agent, or Firm*—Sughrue Mion, PLLC (57) ABSTRACT

In an FM-CW radar apparatus, while a distance and velocity of a target are measured by simultaneously transmitting an FM modulation wave along a frequency-up direction and an FM modulation wave along a frequency-down direction toward this target, physically-required radar signal measuring time thereof can be reduced by ½. The FM-CW radar apparatus is arranged by employing: a transmission unit for separately producing a first FM modulation wave along a frequency-up direction and a second FM modulation wave along a frequency-down direction to transmit both the first FM modulation wave and the second FM modulation wave at the same time; a reception unit for receiving reflection waves reflected from an object, which are caused by the first and second FM modulation waves; a beat signal detection unit for detecting a first beat signal and a second beat signal in a separate manner between the reflection waves and the first and second FM modulation waves; and an analysis apparatus for analyzing frequency components of the first and second beat signals so as to measure a distance of the object and also a velocity of the object.

3 Claims, 8 Drawing Sheets

FM-CW RADAR APPARATUS

BACKGROUND OF THE INVENTION

1. Field of the Invention

The present invention generally relates to a radar apparatus which is mounted on an automobile and/or installed on a road facility so as to detect an object (obstacle and traveling vehicle) appeared on a road. That is, the present invention is related to an FM-CW radar apparatus for detecting a beat signal of an FM transmission signal wave, which is produced by a reflection wave reflected from an object, and for analyzing a frequency component of the beat signal so as to calculate both a distance and a velocity-of the object. More specifically, the present invention is directed to an FM-CW radar apparatus capable of reducing a measuring time duration by ½, required to detect an object in such a manner that both an FM modulation wave along a frequency-up direction and an FM modulation wave along a frequency-down direction are simultaneously transmitted, and then, beat frequency components with respect to the respective FM modulation waves are analyzed so as to calculate a distance and a velocity of an object.

2. Description of the Related Art

In general, as described in, for instance, Japanese Patent Application Laid-open No. 63-275976 (Japanese Patent No. 2550574), FM-CW type radar apparatus have be widely used as radar apparatus designed for automobiles.

Figure 7:
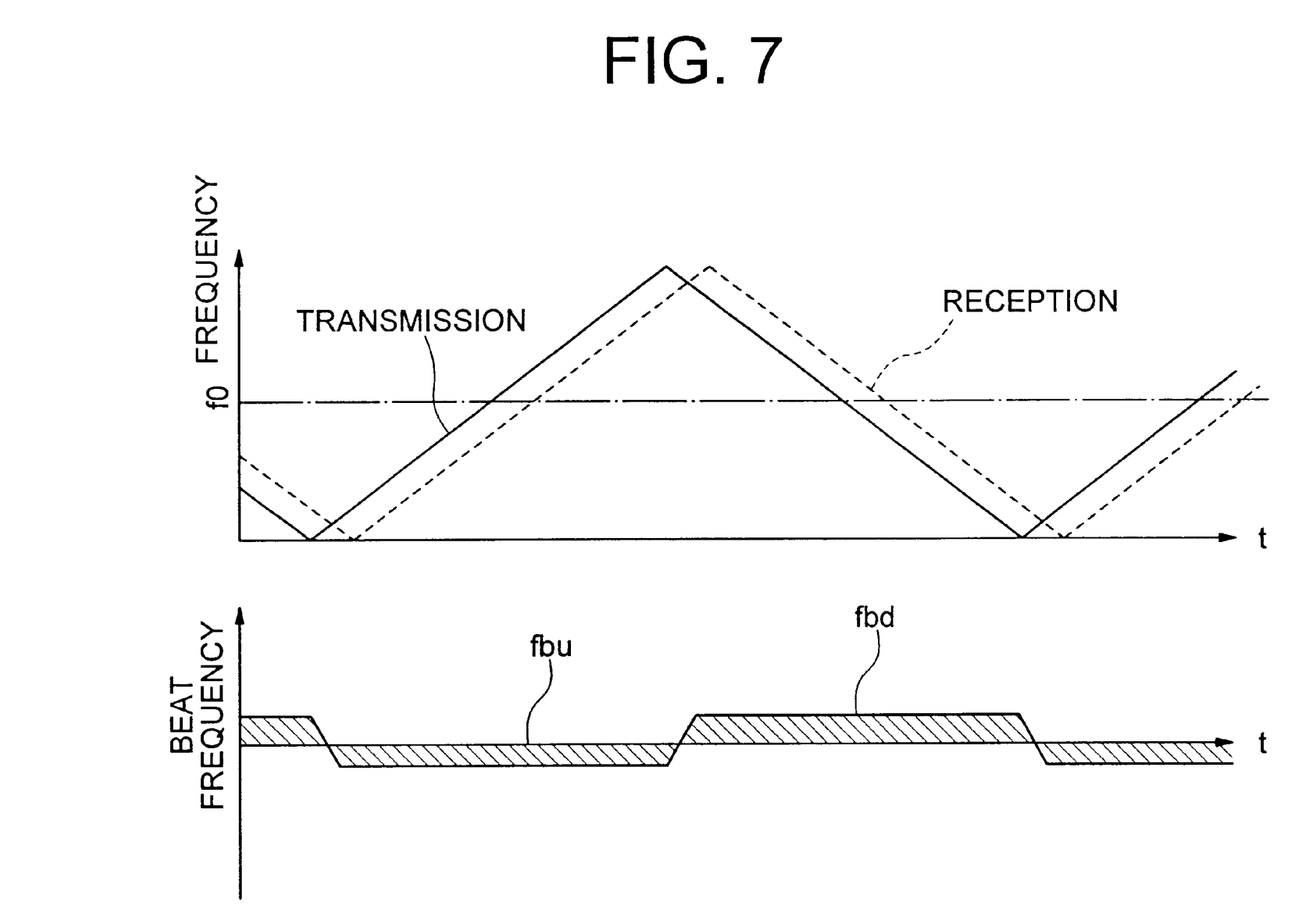
FIG. 7 is a waveform diagram for explaining the operations of the conventional FM-CW radar apparatus with respect to the stationary object.
Figure 8:
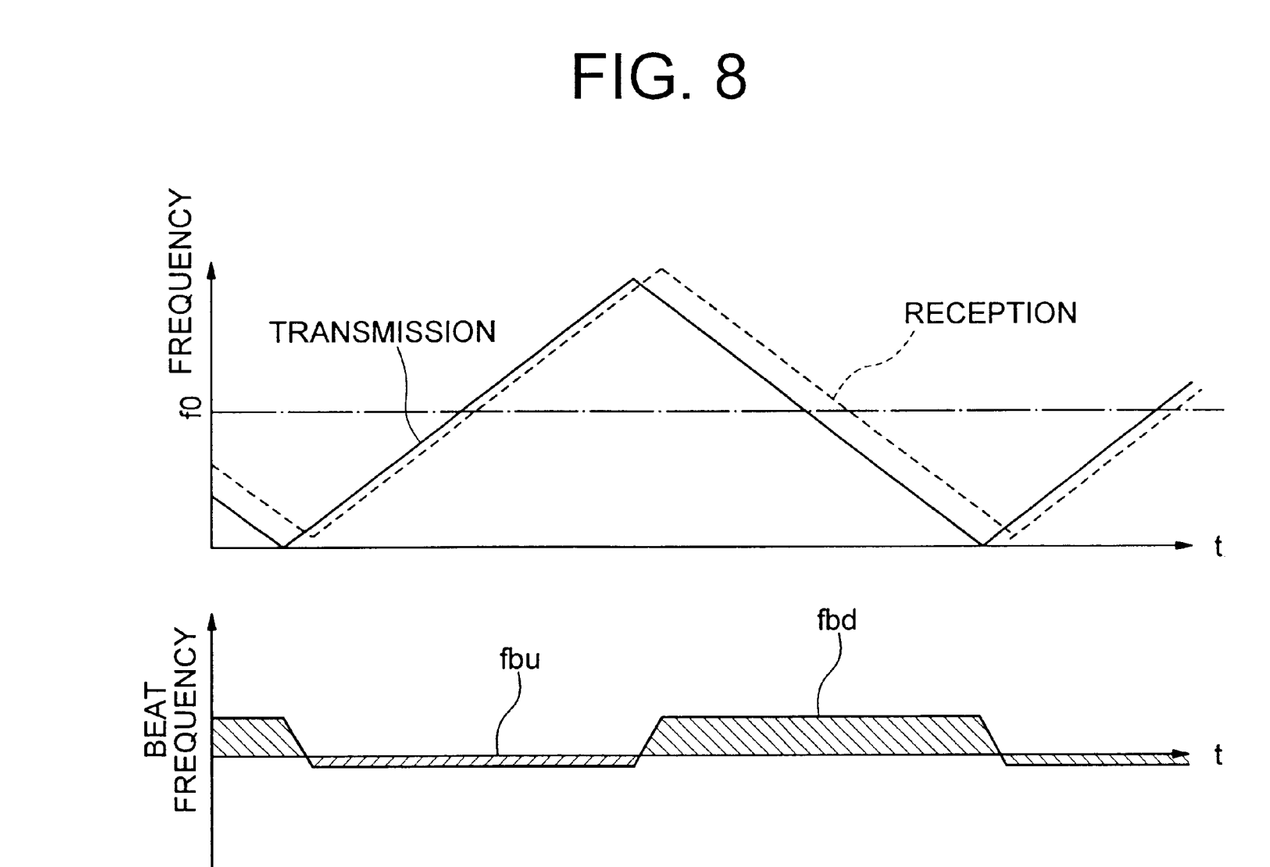
FIG. 8 is a waveform diagram for describing the operations of the conventional FM-CW radar apparatus with respect to the moving object.

FIG. 7 and FIG. 8 are explanatory diagrams for explaining a basic idea of a conventional FM-CW radar apparatus. That is, FIG. 7 represents a change in reception frequencies and a change in beat frequencies in the case that a signal is transmitted to a stationary object, whereas FIG. 8 shows a change in reception frequencies and a change in beat frequencies in such a case that a signal is transmitted to a moving object.

In these drawings, transmission frequencies of transmission signals to objects (targets) which should be detected; reception frequencies of reflection signals reflected/received from the objects; and the respective beat frequencies "fbu" and "fbd" obtained when the signal is frequency-modulated along the up direction, and the signal is frequency-modulated along the down direction are represented in the form of waveforms as a relationship with respect to time "t", respectively.

In FIG. 7, a carrier wave (FM modulation wave) having a center frequency "f0" is transmitted by way of an FM modulation method by which the carrier wave is repeatedly changed to a triangular shape.

A triangular-shaped wave indicated by a solid line in FIG. 7 shows a relationship between the frequency of the transmission signal and the time "t". Another triangular-shaped wave indicated by a broken line shows a relationship between a reception signal and the time "t". This reception signal is reflected/received from, for example, an object located at a distance "R". This triangular-shaped wave is delayed by such a time duration defined by that the transmission signal has been transmitted, and the reflection signal is received.

In this case, assuming now that frequencies of beat signals constructed of frequency differences between transmission signals and reception signals during frequency-up modulation and also frequency-down modulation are selected to be "fbu" and "fbd", the respective beat frequencies "fbu" and "fbd" are expressed by the below-mentioned equation (1).

$$fbu = -fr$$
$$fbd = fr \tag{1}$$

It should be noted that in the above-described equation (1), symbol "fr" shows a beat frequency caused by a reflection signal which is reflected from a stationary object located at a distance of "R". This beat frequency is given by the below-mentioned equation (2) by employing a repetition frequency "fm" of an FM signal (FM modulation wave), a frequency shift width "ΔF" of the FM signal, and a light velocity "c".

$$fr = 4 \times R \cdot fm \cdot \Delta F / c \tag{2}$$

Based upon this equation (2), the distance "R" is calculated in accordance with the below-mentioned equation (3).

$$R = fr \cdot c / (4 \times fm \cdot \Delta F) \tag{3}$$

On the other hand, in the case that an object is moved, both a frequency change in transmission signals and a frequency change in reception signals with respect to time, which are caused by the Doppler effect, are as indicated in FIG. 8.

In general, a Doppler frequency "fv" is given by the following equation (4).

$$fv = 2 \times vr \cdot f0 / c \tag{4}$$

In this equation (4), symbol "vr" indicates a velocity (speed) of the object. This velocity "vr" of the object may be given by the below-mentioned equation (5).

$$vr = fv \cdot c / (2 \times f0) \tag{5}$$

Also, in FIG. 8, the beat frequencies "fbu" and "fbd" which are caused by reflection signals reflected from such an object which is approached are defined based upon the below-mentioned equation (6), namely are equal to such values obtained by adding the Doppler frequency "fv" to the beat frequencies obtained in the case of the stationary object.

$$fbu = -fr + fv$$
$$fbd = fr + fv \tag{6}$$

In accordance with the above-described equation (6), both the Doppler frequency "fv" and the beat frequency "fr" are expressed based upon the below-mentioned equation (7).

$$fv = (fbd + fbu)/2$$
$$fr = (fbd - fbu)/2 \tag{7}$$

The above-explained equation (7) is substituted for the above-mentioned equations (3) and (5), so that both the distance "R" of the object and the velocity "vr" of this object may be calculated by employing the measured beat frequencies "fbu" and "fbd" as follows.

$$R = (fbd - fbu) \cdot c / (8 \times fm \cdot \Delta F)$$
$$vr = (fbd + fbu) \cdot c / (4 \times f0) \tag{8}$$

In this case, resolution "Δv" of the velocity "vr" is determined based upon analyzable minimum frequencies of the beat frequencies "fd" and "fr". Since the repetition frequency of the FM modulation wave is equal to "fm", this resolution "Δv" of the velocity "vr" may be determined for either a frequency ascent time period or a frequency descent time period (=2×fm) one time.

In other words, the resolution "Δv" of the velocity "vr" may be expressed by the following equation (9).

$$\Delta v = fm \cdot c / f0 \quad (9)$$

On the other hand, in the case that a plurality of objects are present on a road, a plurality of beat signals are produced during the frequency-up modulation and also during the frequency-down modulation, the total number of which correspond to the total number of these objects.

In this case, in order to detect only a specific object, a beat signal of the relevant object is selected from the plurality of beat signals. Then, both the distance "R" and the velocity "vr" of this specific object are calculated from the respective beat signals during both the frequency-up modulation and the frequency-down modulation.

In order to select a combination of beat signals, such data as magnitudes of signal components of these beat signals may be used as reference purposes.

In other words, such beat signals whose signal levels are substantially equal to each other are selected from signals obtained during the frequency-up modulation and the frequency-down modulation, and then, the selected beat signals are combined with each other.

On the other hand, while an interval control operation between successively-driven automobiles is carried out, such a fact is known. That is, a change in vehicle drive speeds rather than a change in the above-described intervals between the successively-driven vehicles may give a large influence to a comfortable driving condition.

As a consequence, in order that a vehicle speed of the own vehicle is smoothly controlled in response to a relative speed with respect to a preceding vehicle so as to improve such a comfortable driving condition, this relative speed should be measured in high resolution.

In the above-explained radar apparatus, as previously described, in order to improve the resolution "ΔV" of the velocity "vr", the repetition period of the modulation should be set to the longer repetition period.

However, when the repetition period is made longer, the data updating period is lowered directly proportional to this long repetition period. As a result, there is a problem that the response characteristic of the radar detection operation is lowered.

In particular, generally speaking, in an automobile radar apparatus, while a radar beam is scanned, distances along a plurality of directions are measured so as to recognize a direction of a preceding vehicle. When data is updated one time, distances must be measured plural times in correspondence with a scanning direction.

As previously described, in the FM-CW radar apparatus, while the beat signal between the reflection signals is measured during the two modulation periods (namely, frequency-up modulation period and frequency-down modulation period), both the distance "R" and the velocity "vr" are measured. As a result, the time duration required for measuring the velocity "Vr" must become two times longer than the time duration required for measuring the Doppler signals.

For example, in such a radar apparatus having a center frequency "f0" of 76.5 GHz, in order to measure a radar signal in resolution of such a relative speed (=0.5 km/h), such a time duration of "1/fm (=c/(f0·Δv)=0.028s)" per one direction is required. Thus, a time duration of "5·1/fm (=0.14 s)" per 5 directions is needed, which is five times longer than the first-mentioned time duration of "1/fm".

Normally, in order to measure an angle with higher precision, or to measure a wider range, the total number of scanning directions must be increased. This implies that measuring time duration is increased. In other words, this implies that a time duration required for a single scanning operation is increased. As a result, this may induce that the control response characteristic and the control performance of the FM-CW radar apparatus are deteriorated.

For example, in the conventional radar apparatus described in the above-explained Japanese Patent Application Laid-open No. 63-275976 (Japanese Patent No. 2550574), while both the upper side band signal and the lower side band signal are transmitted at the same time, the frequencies of which are repeated along the ascent direction and also the descent direction within a constant time period, both the distance "R" and the velocity "vr" of the object are measured from the frequency differences in the reflection signals.

The above-explained conventional radar apparatus is not directed to shortening of the measuring time. However, as a result, since the signal modulation is performed one time in order to measure the velocity, this conventional radar apparatus is in principle arranged in such a manner that the measuring time may be reduced by ½.

However, in this conventional radar apparatus, the reference oscillation signal (carrier wave) is mixed with the frequency modulation signal by the up-converter, and thereafter, both the upper side band signal and the lower side band signal are employed as the local signal. This local signal is used to extract the beat signals of the reflection waves and also the transmission waves. As a consequence, while the basic wave is suppressed, the upper side band signal must be completely separated from the lower side band signal.

To the contrary, in the millimeter band having the center frequency of 76 GHz employed in an automobile radar, the maximum occupied bandwidth is allowed only up to 1 GHz. Also, such a filtering technique could not be so far established, by which a practically operable filter having a sharp cut-off characteristic in the millimeter band is constructed. As a result, the above explained radar apparatus described in Japanese Patent Application Laid-open No. 63-275976 cannot be practically realized.

As described above, in the conventional FM-CW radar apparatus, when the repetition periods of the modulation operations are set to such long repetition periods in order to measure the relative velocity between the object and this radar apparatus in better resolution, the following problem may occur. That is, the data updating time period is lowered, so that the detection response characteristic is lowered.

Also, in such a case that this conventional FM-CW radar apparatus is applied to control the interval between the successively-driven vehicles, when the speed changes are controlled in the suppression mode in order to improve the comfortable driving condition, there is such a problem that the lengthy time is required to measure the velocity, and therefore, both the control response characteristic and the control performance would be lowered.

Also, as explained in the conventional radar apparatus of Japanese Patent Application Laid-open No. 63-275976 (Japanese Patent No. 2550574), in such a case that both the upper side band signal and the lower side band signal are transmitted at the same time, the frequencies of which are repeated along the ascent direction and also the descent direction within a constant time period, both the upper side band signal and the lower side band signal should be completely separated from each other, while completely suppressing the basic wave signal. Therefore, there is such a problem that this radar apparatus cannot be realized in such a frequency band which is used in the automobile radar apparatus.

SUMMARY OF THE INVENTION

The present invention has been made to solve the above-described problems, and therefore, has an object to provide such an FM-CW radar apparatus capable of reducing a physically-required radar signal measuring time duration by ½, while measuring means for measuring both a distance of an object and a velocity thereof by way of both a frequency-up modulation and a frequency-down modulation is applied thereto.

To achieve the above-explained object, an FM-CW radar apparatus according to the present invention is characterized by comprising: transmission means for separately producing a first FM modulation wave along a frequency-up direction and a second FM modulation wave along a frequency-down direction to transmit both the first FM modulation wave and the second FM modulation wave at the same time; reception means for receiving reflection waves reflected from an object, which are caused by the first and second FM modulation waves; beat signal detection means for detecting a first beat signal and a second beat signal in a separate manner between the reflection waves and the first/second FM modulation waves; and an analysis apparatus for analyzing frequency components of the first and second beat signals so as to measure a distance of the object and also a velocity of the object.

Also, the FM-CW radar apparatus according to the present invention is characterized in that a frequency of the first FM modulation wave and a frequency of the second FM modulation wave are set in such a manner that the frequencies thereof are not intersected with each other.

Further, the FM-CW radar apparatus according to the present invention is characterized in that a frequency of the first FM modulation wave and a frequency of the second FM modulation wave are set in such a manner that the frequencies thereof are intersected with each other in the vicinity of each of center frequencies of the first and second FM modulation waves.

BRIEF DESCRIPTION OF THE DRAWINGS

For a better understanding of the present invention, reference is made of a detailed description in conjunction with the accompanying drawings, in which.

DETAILED DESCRIPTION OF THE PREFERRED EMBODIMENTS

Embodiment 1

Referring now to drawings, an FM-CW radar apparatus according to Embodiment 1 of the present embodiment will be described in detail.

Figure 1:
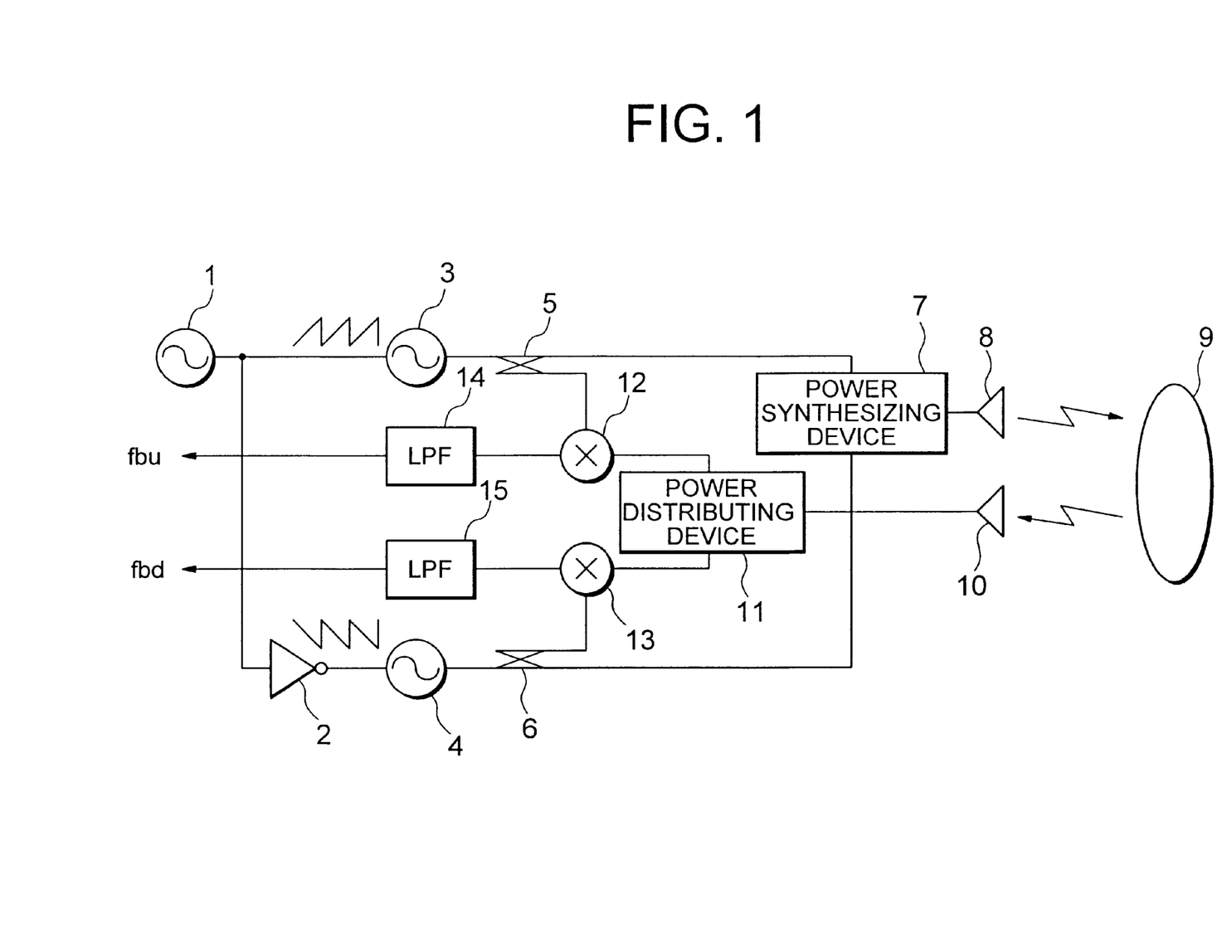
FIG. 1 is a schematic block diagram for representing an arrangement of an FM-CW radar apparatus in accordance with Embodiment 1 of the present invention.

FIG. 1 is a schematic block diagram for representing an arrangement of an FM-CW radar apparatus according to an embodiment mode 1 of the present invention.

Figure 2:
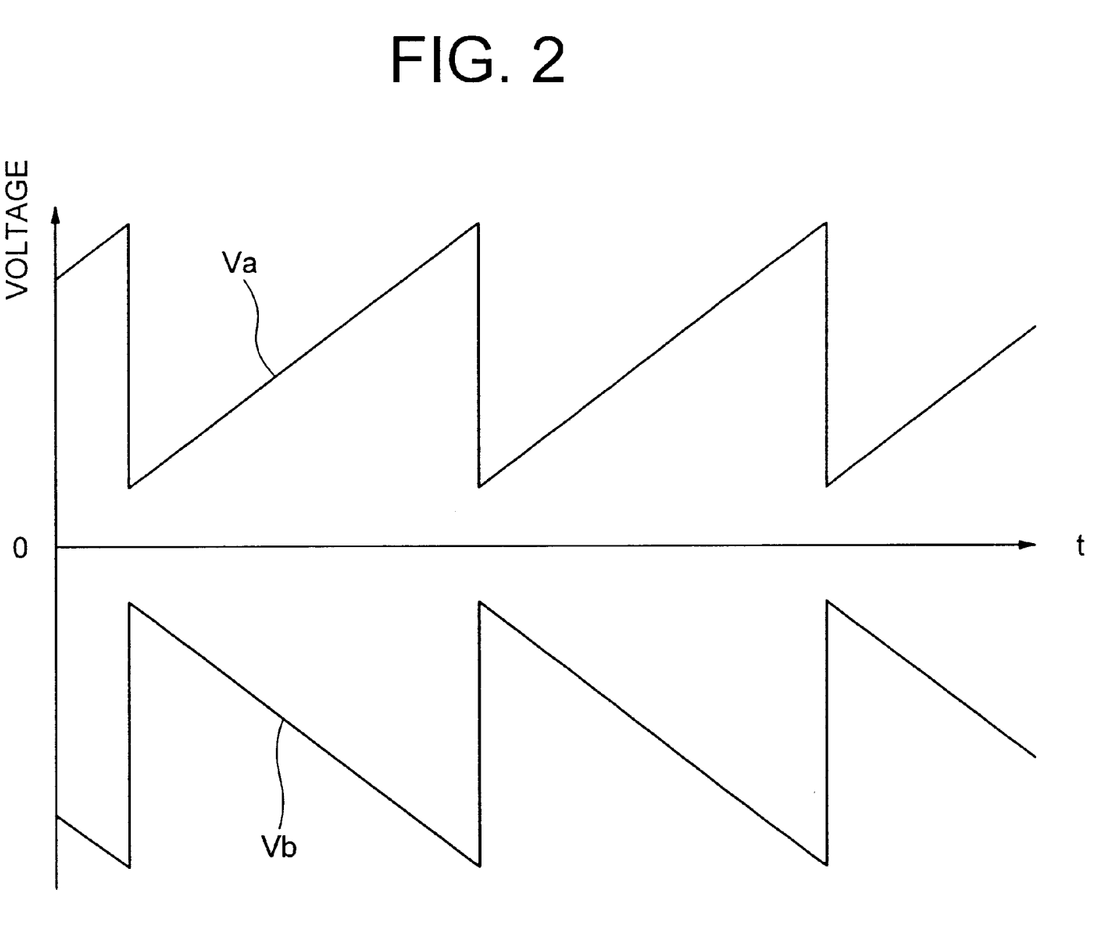
FIG. 2 is a waveform diagram for representing voltage signals which are outputted from both a saw-tooth waveform oscillator and an inverting amplifier employed in the radar apparatus of Embodiment 1 of the present invention.

FIG. 2 is a waveform diagram for representing voltage signals which are outputted from both a saw-tooth waveform oscillator and an inverting amplifier employed in the radar apparatus of Embodiment 1.

Figure 3:
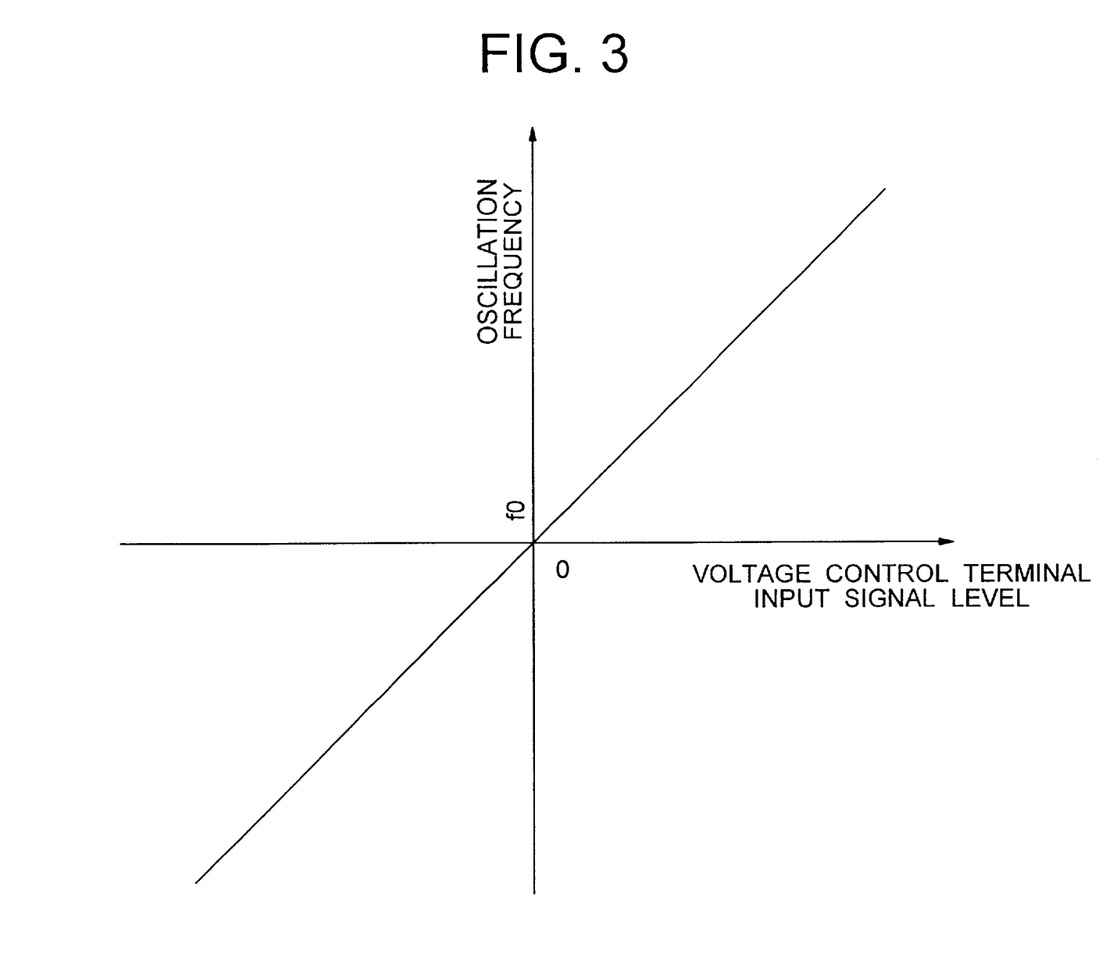
FIG. 3 is an explanatory diagram for explaining a characteristic of each of voltage-controlled oscillators employed in the radar apparatus of Embodiment 1 of the present invention.

FIG. 3 is an explanatory diagram for representing a relationship between an input signal level and an oscillation frequency of each of voltage-controlled oscillators employed in the radar apparatus of FIG. 1.

Figure 4:
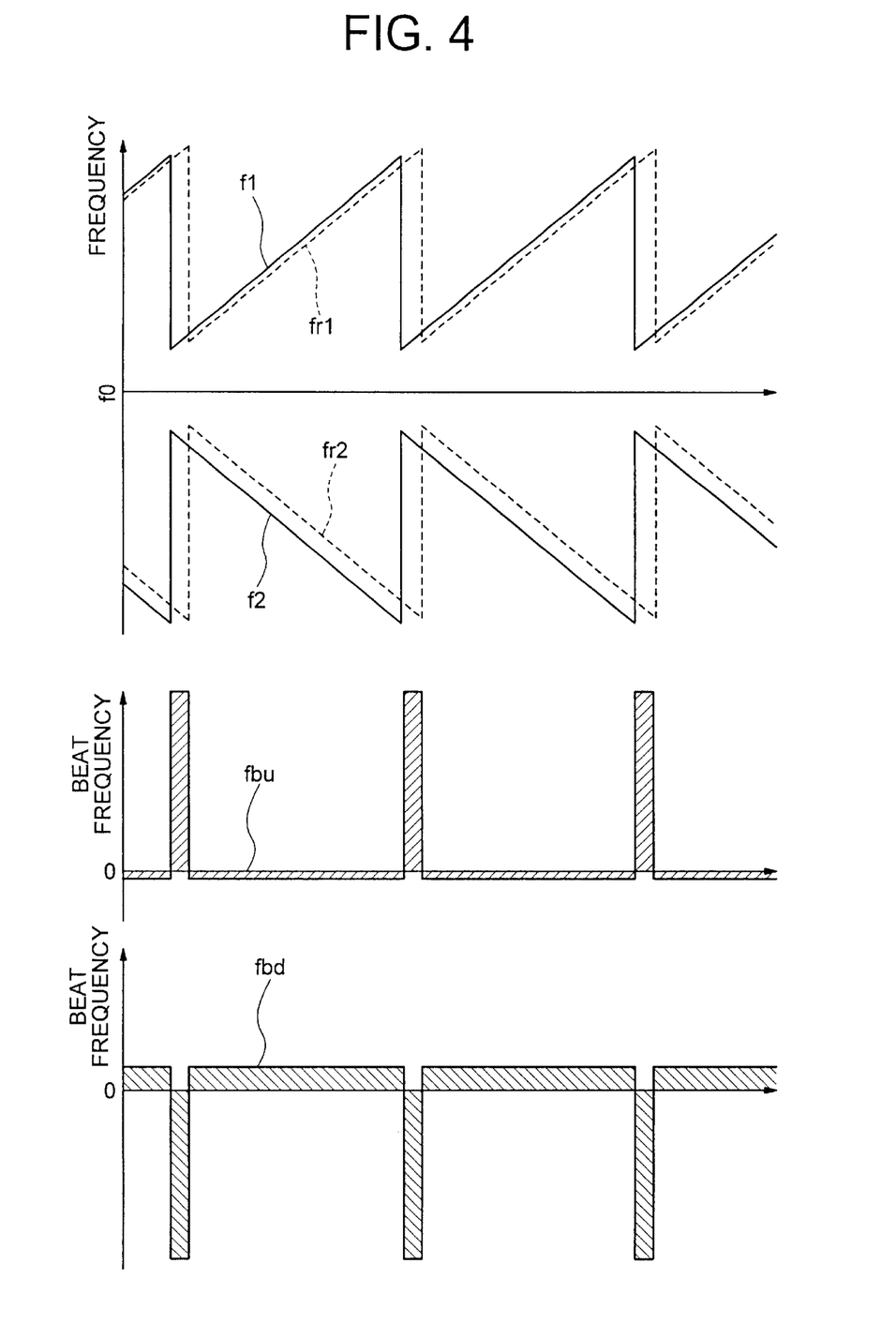
FIG. 4 is a waveform diagram used to explain operations of the radar apparatus in accordance with Embodiment 1 of the present invention.

Also, FIG. 4 is a waveform diagram for representing the oscillation frequency of each of the voltage-controlled oscillators, a frequency of a reception signal (electromagnetic wave signal), and a frequency of a beat signal in the radar apparatus of FIG. 1.

In FIG. 1, there are shown: a saw-tooth wave oscillator 1, an inverting amplifier 2, a first voltage-controlled oscillator 3, a second voltage-controlled oscillator 4, a first coupling device 5, a second coupling device 6, a power synthesizing device 7, a transmission antenna 8, a target (object) 9 of a radar apparatus, a reception antenna 10, a power distributing device 11, a first frequency mixer 12, a second frequency mixer 13, a first low-pass filter 14, and also a second low-pass filter 15.

The first voltage-controlled oscillator 3 is connected to the saw-tooth wave oscillator 1, and the second voltage-controlled oscillator 4 is connected via the inverting amplifier 2 to this saw-tooth wave oscillator 1.

The first coupling device 5 derives a portion of the output signal of the first voltage-controlled oscillator 3, and the second coupling device 6 derives a portion of the output signal of the second voltage-controlled oscillator 4.

The power synthesizing device 7 synthesizes the output signal of the first coupling device 5 with the output signal of the second coupling device 6, and the transmission antenna 8 radiates the signal power synthesized by the power synthesizing device 7 as electromagnetic waves.

The reception antenna 10 receives electromagnetic waves reflected from the target 9, and the power distributing device 11 distributes the reception power of the reception antenna 10 into two signal systems.

The first frequency mixer 12 mixes the reception power distributed by the power distributing device 11 with the coupled power of the first coupling device 5.

The second frequency mixer 13 mixes the reception power distributed by the power distributing device 11 with the coupled power of the second coupling device 6.

The first low-pass filter 14 is connected to the output of the first frequency mixer 12, and the second low-pass filter 15 is connected to the output of the second frequency mixer 13.

Both the first low-pass filter 14 and the second low-pass filter 15 are connected to an analyzing apparatus (not shown)

which is employed so as to measure both a distance of the target 9, a velocity of this target 9, and the like. The first and second low-pass filters 14 and 15 enter a beat signal "fbu" and another beat signal "fbd" to this analyzing apparatus.

Referring now to FIG. 1 to FIG. 4, a description is made of operations of the FM-CW radar apparatus according to Embodiment 1 of the present invention.

First, an output voltage waveform "Va" (see FIG. 2) of the saw-tooth wave oscillator 1 is applied to a voltage control terminal of the first voltage-controlled oscillator 3, and also an output voltage waveform "Vb" of the inverting amplifier 2 is applied to a voltage control terminal of the second voltage-controlled oscillator 4. This output voltage waveform "Vb" corresponds to an inverted waveform of the above-explained output voltage waveform "Va".

A relationship between signal levels of the voltage signals entered into the voltage control terminals of the first and second voltage-controlled oscillators 3 and 4, and oscillation frequencies of these oscillators is indicated in FIG. 3.

As apparent from the characteristic shown in FIG. 3, when the respective output voltage waveforms "Va" and "Vb" (see FIG. 2) are applied to the respective voltage-controlled oscillators 3 and 4, the oscillation frequencies of the respective voltage-controlled oscillators 3 and 4 are changed, as indicated by solid lines "f1" and "f2" of FIG. 4, respectively.

In other words, the output signal (oscillation signal) of the first voltage-controlled oscillator 3 constitutes a modulation wave (modulation signal) along a frequency-ascent direction, whereas the output signal of the second voltage-controlled oscillator 4 constitutes a modulation wave (modulation signal) along a frequency-descent direction.

The output signals from the first and second voltage controlled oscillators 3 and 4 are penetrated through the first and second coupling devices 5 and 6, and thereafter, are synthesized with each other by the power synthesizing device 7, and then, the synthesized signal is radiated as electromagnetic waves from the transmission antenna 8 into the space.

The electromagnetic waves radiated into the space are reflected from the target 9 to produce reflection waves which will be received by the reception antenna 10. This target 9 is located at a position which is separated from the FM-CW radar apparatus by a preselected distance.

At this time, the electromagnetic waves received by the reception antenna 10 are delayed by time " " which is defined by that the electromagnetic waves are reached from the transmission antenna 9 to the target 9, and thereafter are returned to the reception antenna 10.

As a consequence, frequencies of the received electromagnetic waves are delayed by time" " and are changed, as indicated by broken lines "fr1" and "fr2" in FIG. 4.

The electromagnetic waves received by the reception antenna 10 are equally distributed by the power distributor 11, and the equally-distributed electromagnetic waves are entered into the first and second frequency mixers 12 and 13, respectively.

The respective first/second frequency mixers 12 and 13 mix the distributed reception electromagnetic waves with a portion of the output signals of the respective first/second voltage-controlled oscillators 3 and 4, which are supplied from the first and second coupling devices 5 and 6, so that these first and second frequency mixers 12 and 13 produce both a difference signal (namely, beat signal) and a summation signal between the transmission frequency and the reception frequency.

The respective first/second low-pass filters 14 and 15 extract only such low-frequency beat components within the pass-band bandwidths of these first/second low-pass filters 14 and 15 from the output signals derived from the respective first/second frequency mixers 12 and 13. Then, these low-pass filters 14 and 15 output these low frequency beat components.

The beat signal "fbu" outputted from the first low-pass filter 14 corresponds to such a difference signal between the modulation wave along the frequency-up (ascent) direction outputted from the first voltage-controlled oscillator 3 and a reflection wave of this modulation wave, and the frequency of this first beat signal "fbu" is changed, as represented in FIG. 4.

At this time, the output signal of the first frequency mixer 12 also contains another difference signal (beat signal) between the modulation wave along the frequency-up direction, which is outputted from the first voltage-controlled oscillator 3, and a reflection signal made by the modulation wave along the frequency-down (descent) direction, which is outputted from the second voltage-controlled oscillator 4.

However, the frequency of the beat signal contained in the output signal from the first frequency mixer 12 is substantially equal to a difference between the modulation wave along the frequency-up direction and the modulation wave along the frequency-down direction, and therefore, is very high. As a result, since this high frequency of the beat signal is located outside the pass-band of the first low-pass filter 14, this beat signal is not derived from the first low-pass filter 14.

Similarly, the beat signal "fbd" outputted from the second low-pass filter 15 corresponds to such a difference signal between the modulation wave along the frequency-down (descent) direction outputted from the second voltage-controlled oscillator 4 and a reflection wave of this modulation wave, and the frequency of this second beat signal "fbd" is changed, as represented in FIG. 4.

The beat signals which are extracted from the respective first/second low-pass filters 14 and 15 in the above-explained manner are sampled, respectively, and then, the sampled beat signals are analyzed by the analyzing apparatus by way of the FFT frequency analysis manner. As a consequence, the analyzing apparatus can simultaneously detect both the beat frequency "fbu" of the reflection wave which is reflected from the target 9 and is caused by the modulation wave along the frequency-up direction, and also, the beat frequency "fbd" of the reflection wave which is reflected from the target 9 and is caused by the modulation wave along the frequency-down direction.

Subsequently, similarly to the calculation case of the conventional radar apparatus, both a distance "R" of the target 9 and a velocity "vr" of this target 9 may be calculated from the beat frequencies "fbu" and "fbd".

Note that, in this case, since the repetition frequency "fm" of the FM modulation becomes two times higher than the repetition frequency of the FM modulation in the conventional radar apparatus, both the distance "R" and the velocity "vr" of the target 9 are expressed by the below-mentioned equation (10) by employing such a value obtained by dividing the repetition frequency "fm" by 2.

$$R = (fbd - fbu) \times c/8/(fm/2)/\Delta F$$
$$vr = (fbd + fbu) \times c/4/f0 \qquad (10)$$

As previously described, while both the modulation wave along the frequency-up direction and the modulation wave along the frequency-down direction, which are produced from the individual voltage-controlled oscillators 3 and 4, are transmitted at the same time, the beat signals between each of the modulation waves and the reflection signals are measured at the same time. Then, the reflection signal caused by the frequency-up modulation wave component, and also the reflection signal caused by the frequency-down modulation wave component, which are contained in the reflection signals, are separated/detected. As a result, the respective beat frequency components are analyzed so as to calculate both the distance "R" and the velocity "vr" of the target 9.

As a consequence, the FM-CW radar apparatus can measure both the distance "R" and the velocity "vr" of the target 9 within such a short measuring time duration equal to ½ of the measuring time duration of the conventional radar apparatus, while both the distance resolution and the velocity resolution are not deteriorated.

Also, when an automobile collision preventing apparatus and/or a control apparatus for controlling an interval between successively-driven vehicles are arranged by employing the radar apparatus according to Embodiment 1, the automobile control operations can be carried out within a half of the time period for the conventional radar apparatus. As a result, it is possible to realize such a more safety radar apparatus with high performance.

Also, since the distance/velocity measurement can be carried out within ½ of the conventional measuring time duration, the radar apparatus of this embodiment mode 1 can measure such a wider range than that of the conventional radar apparatus by increasing a total number of scanning directions two times. As a consequence, this radar apparatus can detect obstacles located along the multiple directions and also travel-path-interrupting vehicles appeared near the own vehicle earlier, so that the safety characteristics as to the collision preventing control and the control operation for controlling the successively-driven vehicles can be improved.

Also, since the measuring operations as to the modulation waves along the frequency-up direction and the frequency-down direction are carried out at the same time, the Doppler measuring operation may be accomplished only by the modulation one time. As a result, the measurement having the same velocity resolution can be realized within ½ of the measuring time duration of the conventional radar apparatus.

Furthermore, since the FM modulation wave along the frequency-up direction and the FM modulation wave along the frequency-down direction are separately produced by the individual first/second oscillation means 3 and 4, both the carrier wave and the side band signal along the reverse direction are no longer suppressed. Accordingly, the FM-CW radar apparatus can be readily realized.

Embodiment 2

It should be understood that in the above-described Embodiment 1, the FM-CW radar apparatus is arranged in such a manner that the frequency of the modulation wave along the frequency-up direction is not intersected (overlapped) with the frequency of the modulation wave along the frequency-down direction. Alternatively, the oscillation frequencies of the respective voltage-controlled oscillators 3 and 4 may be modulated in such a manner that the respective frequencies of the modulation waves are intersected with each other.

Subsequently, an FM-CW radar apparatus according to an embodiment mode 2 of the present invention will now be explained, which is arranged in such a manner that frequencies of respective modulation waves are intersected with each other.

In this case, the arrangement of this FM-CW radar apparatus is similar to the above-explained arrangement (see FIG. 1).

Figure 5:
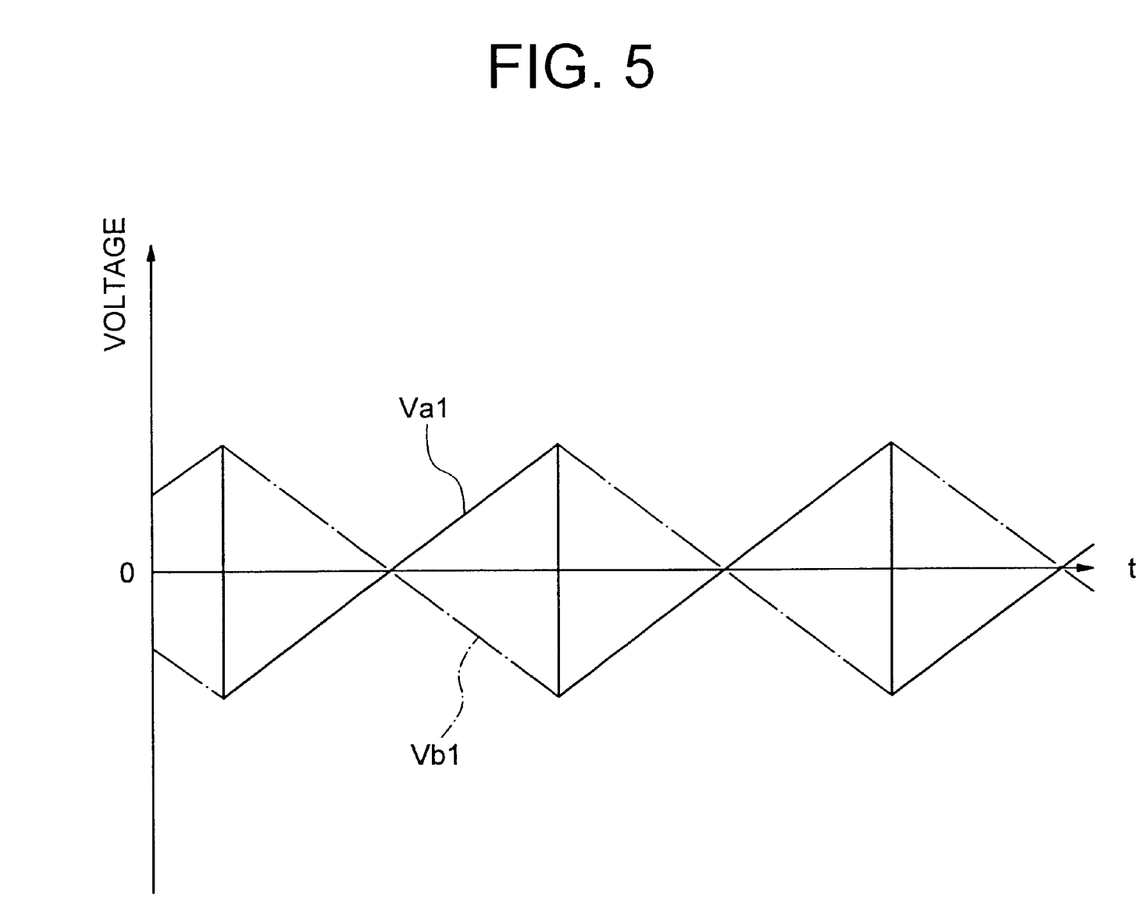
FIG. 5 is a waveform diagram for representing voltage signals which are outputted from both a saw-tooth waveform oscillator and an inverting amplifier employed in an FM-CW radar apparatus of Embodiment 2 of the present invention.

FIG. 5 is a waveform diagram for representing an output voltage waveform "Va1" of a saw-tooth wave oscillator 1, and also an inverted voltage waveform "Vb1" thereof, employed in the FM-CW radar apparatus according to Embodiment 2 of the present invention.

Figure 6:
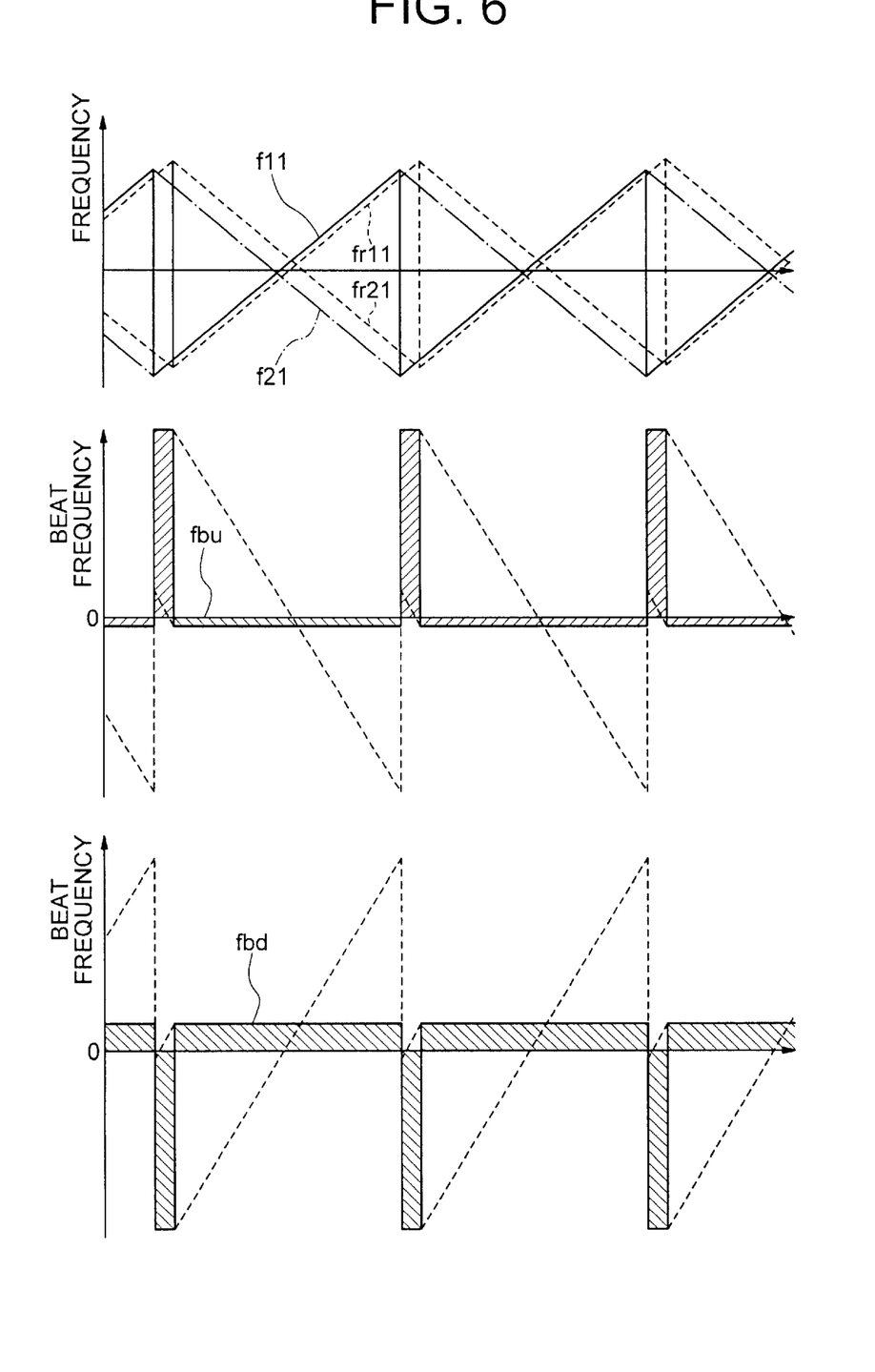
FIG. 6 is a waveform diagram used to explain operations of the radar apparatus in accordance with Embodiment 2 of the present invention.

FIG. 6 is a waveform diagram for showing oscillation frequencies of voltage-controlled oscillators 3 and 4, a frequency of a reception signal, and also a frequency of a beat signal, appeared in the FM-CW radar apparatus of Embodiment 2.

In the case that the output voltage waveforms "Va1" and "Vb1" shown in FIG. 5 are inputted into the respective first/second voltage-controlled oscillators 3 and 4, the oscillation frequencies of the respective voltage-controlled oscillators 3 and 4 are changed as represented by solid lines "f11" and "f21" in FIG. 6, based upon the frequency characteristic indicated in FIG. 3.

Similarly, in this case, frequencies of the reception electromagnetic waves are delayed by time " " as represented in broken lines "fr11" and "fr21" in FIG. 6.

An output signal of the first frequency mixer 12 contains a difference signal (namely, beat signal to be measured) of reflection signals reflected from the target 9, which are caused by the modulation wave along the frequency-up direction (frequency-ascent direction) outputted from the first voltage-controlled oscillator 3, and also this output signal contains another difference signal (namely, beat signal) of reflection signals which are caused by the modulation wave along the frequency-down direction (frequency-descent direction) outputted from the second voltage-controlled oscillator 4.

Normally, a beat signal component (which is substantially coincident with difference between modulation wave along frequency-up direction and modulation wave along frequency-down direction) is very large. However, in such a case that the frequency of the modulation wave along the frequency-up direction is made substantially equal to the frequency of the modulation wave along the frequency-down direction, a frequency of a beat signal becomes low, and thus, is located within the pass band of the first low-pass filter 14.

As a consequence, as indicated by a broken line of FIG. 6, the frequency of the beat signal "fbu" outputted from the first low-pass filter 14 is changed in a temporal manner.

As explained above, since the beat frequency is instantaneously changed, when this beat signal "fbu" is sampled and then analyzed by way of the FFT frequency analysis, the components of the beat signal "fbu" are uniformly distributed within the analyzing frequency range, which is equivalent to such a fact that white noise is superimposed with the beat signal "fbu".

As a consequence, this fact never produces other beat frequency components, but also does not give an adverse influence to the beat frequency of the reflection wave reflected from the target 9, which is caused by the modulation wave along the frequency-up direction.

Similarly as indicated by a broken line of FIG. 6, the frequency of the beat signal "fbd" outputted from the second low-pass filter 15 is changed in a temporal manner.

At this time, noise equivalent to white noise is superimposed with this beat signal "fbd". However, electric power of this noise is equal to such a value obtained by dividing the band width of the second low-pass filter 15 by the frequency modulation width. Since this noise power is very small, namely is on the order of 1/1000 with respect to the electric power of the reflection wave, there is no practical problem.

Also, in the above-described radar apparatus of Embodiment 1, since this radar apparatus is arranged in such a manner that the frequency of the modulation wave along the frequency-up direction is not intersected, or overlapped with the frequency of the modulation wave along the frequency-down direction, the modulation wave bandwidth of this radar apparatus should be made at least two times wider than that of the conventional radar apparatus. In the radar apparatus of Embodiment 2, this radar apparatus is arranged in such a manner that the frequencies of the respective modulation waves are overlapped with each other. As a result, since the modulation wave bandwidth of this radar apparatus may be made substantially equal to that of the conventional radar apparatus, this radar apparatus may effectively utilize the frequency range which is defined by the Japanese Radio Law.

What is claimed is:

1. An FM-CW radar apparatus comprising:

transmission means for separately producing a first FM modulation wave along a frequency-up direction and a second FM modulation wave along a frequency-down direction to transmit both the first FM modulation wave and the second FM modulation wave at the same time;

reception means for receiving reflection waves reflected from an object, which are caused by said first and second FM modulation waves;

beat signal detection means for detecting a first beat signal and a second beat signal in a separate manner between said reflection waves and said first second FM modulation waves;

an analysis apparatus for analyzing frequency components of said first and second beat signals so as to measure a distance of said object and also a velocity of said object; and wherein a frequency of said first FM modulation wave and a frequency of said second FM modulation wave are set in such a manner that said frequencies thereof are intersected with each other in the vicinity of each of center frequencies of said first and second FM modulation waves.

2. An FM-CW radar apparatus comprising:

a transmitting device which separately produces a first FM modulation wave along a frequency-up direction and a second FM modulation wave along a frequency-down direction to transmit both the first FM modulation wave and the second FM modulation wave at the same time;

a receiving device which receives reflection waves reflected from an object, which are caused by said first and second FM modulation waves; and wherein a frequency of said first FM modulation wave and a frequency of said second FM modulation wave are set in such a manner that said frequencies thereof are intersected with each other in the vicinity of each of center frequencies of said first and second FM modulation waves.

3. An FM-CW radar apparatus according to claim 2, further comprising:

a detection device which detects a first beat signal and a second beat signal in a separate manner between said reflection waves and said first and second FM modulation waves; and an analyzing device which analyzes frequency components of said first and second beat signals so as to measure a distance of said object and also a velocity of said object.

* * * * *